US011710492B2

(12) United States Patent
Villette et al.

(10) Patent No.: US 11,710,492 B2
(45) Date of Patent: Jul. 25, 2023

(54) SPEECH ENCODING USING A PRE-ENCODED DATABASE

(71) Applicant: QUALCOMM Incorporated, San Diego, CA (US)

(72) Inventors: Stephane Pierre Villette, San Diego, CA (US); Daniel Jared Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 16/591,478

(22) Filed: Oct. 2, 2019

(65) Prior Publication Data

US 2021/0104250 A1 Apr. 8, 2021

(51) Int. Cl.
| | |
|---|---|
| G06F 17/00 | (2019.01) |
| G10L 19/16 | (2013.01) |
| G06N 5/04 | (2023.01) |
| G06N 20/00 | (2019.01) |
| G10L 19/00 | (2013.01) |

(52) U.S. Cl.
CPC .............. *G10L 19/167* (2013.01); *G06N 5/04* (2013.01); *G06N 20/00* (2019.01); *G10L 2019/0013* (2013.01); *G10L 2019/0014* (2013.01)

(58) Field of Classification Search
CPC ........... G10L 19/167; G10L 2019/0013; G10L 2019/0014; G06N 20/00; G06N 5/04
USPC ............................................. 704/500; 700/94
See application file for complete search history.

(56) References Cited

U.S. PATENT DOCUMENTS

| | | | | |
|---|---|---|---|---|
| 9,076,443 B2* | 7/2015 | Malenovsky | ......... | G10L 19/083 |
| 9,401,155 B2* | 7/2016 | Grancharov | ........... | H04N 19/94 |
| 9,881,627 B2* | 1/2018 | Tsutsumi | .............. | G10L 19/125 |
| 9,966,073 B2* | 5/2018 | Gao | ........................ | G10L 15/26 |
| 10,419,773 B1* | 9/2019 | Wei | ........................ | H04N 19/46 |
| 2005/0228651 A1* | 10/2005 | Wang | ...................... | G10L 19/08 |
| | | | | 704/207 |
| 2015/0243284 A1* | 8/2015 | Guo | ........................ | G10L 15/06 |
| | | | | 704/233 |
| 2017/0125013 A1* | 5/2017 | Yan | ......................... | G10L 15/06 |
| 2018/0286422 A1* | 10/2018 | Liang | ...................... | G10L 19/26 |

* cited by examiner

*Primary Examiner* — Paul C McCord
(74) *Attorney, Agent, or Firm* — Qualcomm Incorporated

(57) ABSTRACT

Methods, systems, and devices for encoding are described. A device, which may be otherwise known as user equipment (UE), may support standards-compatible audio encoding (e.g., speech encoding) using a pre-encoded database. The device may receive a digital representation of an audio signal and identify, based on receiving the digital representation of the audio signal, a database that is pre-encoded according to a coding standard and that includes a quantity of digital representations of other audio signals. The device may encode the digital representation of the audio signal using a machine learning scheme and information from the database pre-encoded according to the coding standard. The device may generate a bitstream of the digital representation that is compatible with the coding standard based on encoding the digital representation of the audio signal, and output a representation of the bitstream.

20 Claims, 10 Drawing Sheets

SPEECH ENCODING USING A PRE-ENCODED DATABASE

FIELD OF INVENTION

The following relates generally to audio encoding, and more specifically to speech encoding using a pre-encoded database.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may include a number of base stations or network access nodes, each simultaneously supporting communication for multiple communication devices.

Some example communication devices may support techniques for encoding and decoding audio signals. Encoding may relate to a process to compress a digital audio signal according to a coding format to produce an encoded (e.g., compressed) audio signal having a reduced number of bits with respect to original audio data of the signal while retaining quality. Decoding may relate to a process to reconstruct or synthesize a digital audio signal from an encoded audio signal according to a coding format. Some example communication devices may support speech coding techniques, which may model an input speech signal using speech-specific parameter estimation and output resulting modeled parameters in a bitstream.

SUMMARY

The described techniques relate to improved methods, systems, devices, and apparatuses that support audio encoding using a pre-encoded database. In some examples, speech coding techniques associated with devices may be implemented to be compatible with speech audio coding standards, for example, such as Adaptive Multi-Rate Wideband (AMR-WB) or Enhanced Voice Services (EVS). Although these speech coding techniques help in some examples, these techniques have a high resource consumption (e.g., processor usage, memory usage) due to the speech audio coding standards.

According to examples of aspects described herein, the disclosed methods and related devices may support standards-compatible audio encoding (e.g., speech encoding) using a pre-encoded database. In some examples, a device may receive a digital representation of an audio signal and identify a database that is pre-encoded offline according to a coding standard (e.g., Adaptive Multi-Rate Wideband (AMR-WB) or Enhanced Voice Services (EVS)). For example, the device may perform offline encoding (uncompressed to compressed) for a high quality audio database using a standard coder and then encode (e.g., represent) the digital representation of the audio signal using a machine learning scheme (e.g., a neural network classifier) and the pre-encoded database. The device may therefore generate a bitstream of the digital representation that may be compatible with the coding standard without have to perform actual run-time encoding. As a result, the device may provide reduced complexity and efficient resource usage, such as processor and memory usage.

A method is described. The method may include receiving a digital representation of an audio signal, identifying, based on receiving the digital representation of the audio signal, a database that is pre-encoded according to a coding standard and that includes a quantity of digital representations of other audio signals, encoding the digital representation of the audio signal using a machine learning scheme and information from the database pre-encoded according to the coding standard, generating a bitstream of the digital representation that is compatible with the coding standard based on encoding the digital representation of the audio signal, and outputting a representation of the bitstream.

An apparatus is described. The apparatus may include a processor, memory coupled with the processor, and instructions stored in the memory. The instructions may be executable by the processor to cause the apparatus to receive a digital representation of an audio signal, identify, based on receiving the digital representation of the audio signal, a database that is pre-encoded according to a coding standard and that includes a quantity of digital representations of other audio signals, encode the digital representation of the audio signal using a machine learning scheme and information from the database pre-encoded according to the coding standard, generate a bitstream of the digital representation that is compatible with the coding standard based on encoding the digital representation of the audio signal, and output a representation of the bitstream.

Another apparatus is described. The apparatus may include means for receiving a digital representation of an audio signal, means for identifying, based on receiving the digital representation of the audio signal, a database that is pre-encoded according to a coding standard and that includes a quantity of digital representations of other audio signals, means for encoding the digital representation of the audio signal using a machine learning scheme and information from the database pre-encoded according to the coding standard, means for generating a bitstream of the digital representation that is compatible with the coding standard based on encoding the digital representation of the audio signal, and means for outputting a representation of the bitstream.

A non-transitory computer-readable medium storing code is described. The code may include instructions executable by a processor to receive a digital representation of an audio signal, identify, based on receiving the digital representation of the audio signal, a database that is pre-encoded according to a coding standard and that includes a quantity of digital representations of other audio signals, encode the digital representation of the audio signal using a machine learning scheme and information from the database pre-encoded according to the coding standard, generate a bitstream of the digital representation that is compatible with the coding standard based on encoding the digital representation of the audio signal, and output a representation of the bitstream.

Some examples of the method, apparatuses, and non-transitory computer-readable medium described herein may further include operations, features, means, or instructions for pre-encoding the database according to the coding standard prior to receiving the digital representation of the audio signal, and selecting the pre-encoded database based on a criterion, where identifying the database pre-encoded according to the coding standard may be based on the selecting.

In some examples of the method, apparatuses, and non-transitory computer-readable medium described herein, the criterion may include one or more of a format of the audio signal, a transmission rate associated with a transmission of the audio signal, or a network associated with the transmission of the audio signal.

In some examples of the method, apparatuses, and non-transitory computer-readable medium described herein, pre-encoding the database according to the coding standard may include operations, features, means, or instructions for encoding a set of packets according to the coding standard, where one or more packets of the set of packets correspond to a database frame in the database, and inserting a set of reset frames between one or more packets of the encoded set of packets.

Some examples of the method, apparatuses, and non-transitory computer-readable medium described herein may further include operations, features, means, or instructions for determining a set of reference points associated with the database based on the set of packets, and assigning the set of reference points in the database based on a parameter including a distance between reset frames of the set of reset frames, where inserting the set of reset frames may be based on the assigning.

Some examples of the method, apparatuses, and non-transitory computer-readable medium described herein may further include operations, features, means, or instructions for selecting a value of the distance from a range of distance values, where assigning the set of reference points in the database may be based on the selecting.

In some examples of the method, apparatuses, and non-transitory computer-readable medium described herein, encoding the digital representation of the audio signal may include operations, features, means, or instructions for ignoring, based on the set of reset frames, one or more dependencies of a packet of the encoded set of packets with respect to one or more other packets of the encoded set of packets, and encoding a current input frame of the audio signal based on the ignoring.

Some examples of the method, apparatuses, and non-transitory computer-readable medium described herein may further include operations, features, means, or instructions for determining a set of continuous packets of the encoded set of packets, where inserting the set of reset frames between the one or more packets of the encoded set of packets may include inserting a first reset frame prior to a first packet of the set of continuous packets of the encoded set of packets, and inserting a second reset frame after a last packet of the set of continuous packets of the encoded set of packets.

Some examples of the method, apparatuses, and non-transitory computer-readable medium described herein may further include operations, features, means, or instructions for determining one or more of a coding mode or a pitch gain associated with the coding standard, where pre-encoding the database may be based on one or more of the coding mode or the pitch gain associated with the coding standard.

Some examples of the method, apparatuses, and non-transitory computer-readable medium described herein may further include operations, features, means, or instructions for estimating a scan result associated with the digital representation of the audio signal and the database, where encoding the digital representation of the audio signal may be based on the scan result.

Some examples of the method, apparatuses, and non-transitory computer-readable medium described herein may further include operations, features, means, or instructions for training the machine learning scheme to match one or more scanning approach decisions for one or more digital representations of one or more audio signals with respect to the database, where estimating the scan result may be based on the training.

In some examples of the method, apparatuses, and non-transitory computer-readable medium described herein, encoding the digital representation of the audio signal may include operations, features, means, or instructions for encoding the digital representation jointly according to the coding standard and an additional coding standard different from the coding standard.

Some examples of the method, apparatuses, and non-transitory computer-readable medium described herein may further include operations, features, means, or instructions for receiving a digital representation of a second audio signal, identifying, based on the receiving of the digital representation of the second audio signal, a set of weighting coefficients of the machine learning scheme, where the set of weighting coefficients may be associated with an additional coding standard different from the coding standard, encoding the digital representation of the second audio signal using the machine learning scheme based on one or more weighting coefficients of the set of weighting coefficients, generating a second bitstream of the digital representation of the second audio signal that may be compatible with the additional coding standard based on the encoding of the digital representation of the second audio signal, and outputting a representation of the second bitstream.

DETAILED DESCRIPTION

Figure 1:
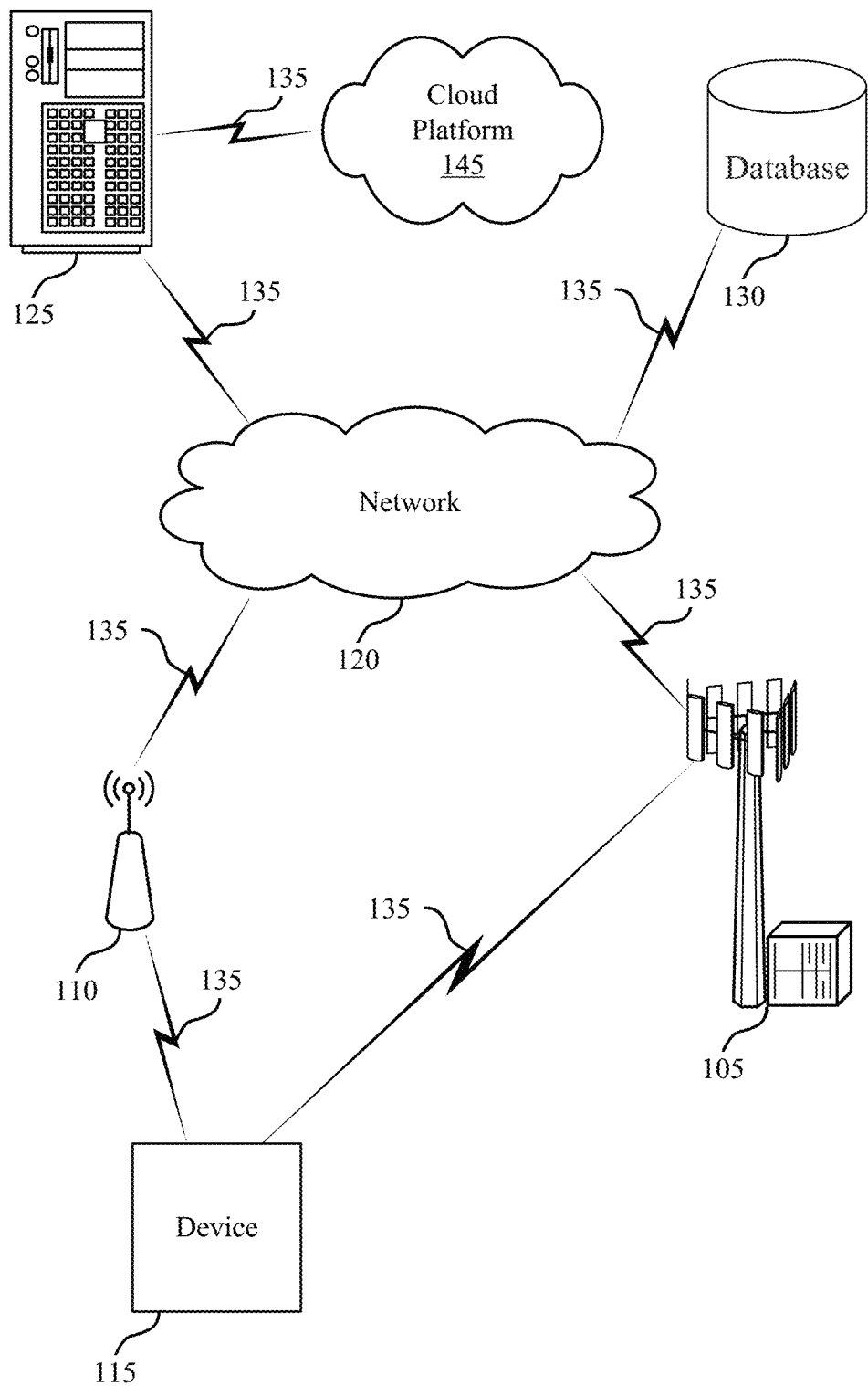
FIG. 1 illustrates an example of a system that supports audio encoding using a pre-encoded database in accordance with aspects of the present disclosure.

Audio coding may include data compression of digital audio signals (e.g., encoding) and reconstruction of those digital audio signals (e.g., decoding). Examples of audio coding may include speech coding, which may be an application of data compression of digital audio signals containing speech. Speech coding may use speech-specific parameter estimation using audio signal processing techniques to model a speech signal, combined with one or more compression algorithms to represent a resulting modeled parameters in a compact bitstream. Some example devices may support speech coding techniques, which may model an input speech signal using speech-specific parameter estimation and output the resulting modeled parameters in a bitstream. In some examples, speech coding techniques may be implemented to be compatible with speech audio coding standards, for example, such as Adaptive Multi-Rate Wideband (AMR-WB) or Enhanced Voice Services (EVS). These speech coding techniques may be related to highly complex operations and consume higher amounts of resources (e.g., memory usage) due to the speech audio coding standards (e.g., standards-compatible speech encoding implementations).

The described techniques relate to improved methods, systems, devices, and apparatuses that support audio encoding, for example, using a pre-encoded database. According to examples of aspects described herein, the disclosed methods and related devices may support standards-compatible audio encoding (e.g., speech encoding) using a pre-encoded database. As an example, a device may receive a digital representation of a speech signal and identify a database that is pre-encoded offline according to a coding standard (e.g., Adaptive Multi-Rate Wideband (AMR-WB) or Enhanced Voice Services (EVS)). For example, the device may perform offline encoding for a high quality audio database using a standard coder and subsequently encode the digital representation of the audio signal using a machine learning scheme (e.g., a neural network classifier) and the pre-encoded database. The device may, as a result, generate a bitstream of the digital representation that may be compatible with the coding standard without demanding actual run-time encoding. As a result, the device may provide reduced complexity and efficient resource usage, for example, processor and memory usage.

Aspects of the subject matter described herein may be implemented to realize one or more advantages. The described techniques may support audio encoding using a pre-encoded database, supporting improvements in power savings, performance capabilities, and user experience, among other advantages. Supported techniques may include features for encoding a digital representation of an audio signal (e.g., a speech signal) using a machine learning scheme and a database that may be pre-encoded offline according to a coding standard, thereby reducing processing time, complexity, memory usage, and power usage of systems compared to some encoding processes (e.g., run-time encoding).

Aspects of the disclosure are initially described in the context of a system. Aspects of the disclosure are then described with reference to diagrams and process flows. Aspects of the disclosure are further illustrated by and described with reference to apparatus diagrams, system diagrams, and flowcharts that relate to audio encoding using a pre-encoded database.

FIG. 1 illustrates an example of a system 100 that supports audio encoding using a pre-encoded database in accordance with aspects of the present disclosure. The system 100 may include a base station 105, an access point 110, a device 115, a server 125, a database 130, and a cloud platform 145. The base station 105, the access point 110, the device 115, the server 125, and the database 130 may communicate with each other via a network 120 using communications links 135. In some examples, the system 100 may support using a pre-encoded database, thereby providing enhancements to audio encoding.

The base station 105 may wirelessly communicate with the device 115 via one or more base station antennas. Base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

The device 115 may incorporate aspects for training and utilizing machine learning schemes, for example, a neural network. The techniques described herein for using machine learning schemes and an input database (e.g., a high quality audio signal database) may support autonomous or semi-autonomous functions related to, for example, standards-compatible audio encoding (e.g., speech encoding) using a pre-encoded database. In an example, the device 115 may encode a received audio signal to a standards compatible bitstream according to a coding standard, using a neural network. In an example, the neural network may predict an outcome of a scanning search associated with the received audio signal (e.g., a speech signal) with respect to an audio signal database (e.g., a speech database).

The device 115 may, additionally or alternatively, include or be referred to by those skilled in the art as a user equipment (UE), a user device, a cellular phone, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

The device 115 may include memory, a processor, an output, and a communication module. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to process data (e.g., speech signals) from and/or write data (e.g., encoded or compressed signals, for example a bitstream) to the memory. The processor may also be configured to provide signal processing, for example, signal encoding or compression, and training of a learning network. For example, the device 115 may support encoding a digital representation of an audio signal using a machine learning scheme and information from a database pre-encoded according to a coding standard, according to the techniques described herein. In some examples, the device 115 may support generating a bitstream of the digital representation that is compatible with the coding standard and outputting a representation of the bitstream, according to the techniques described herein.

According to aspects described herein, the device 115 may support one or more types of audio signals. For example, the device 115 may support encoding of a digital audio signal (e.g., a digital representation of an audio signal). For example, the audio signal may be a pulse code modulation (PCM) representation of an audio signal. In some examples, the audio signal may include a digital representation of an audio signal input to the device 115 via an input component (e.g., a microphone) coupled to the device 115, an audio signal stored on a memory of the device 115, an audio signal stored on any of the server 125, the database 130, or the cloud platform 145, or an audio signal received by the device 115 via communications links 135.

The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the device 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, audio encoding using machine learning schemes and a pre-encoded database.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, a map server, a road assistance server, database server, communications server, home server, mobile server, or any combination thereof. The server 125 may also transmit to the device 115 a variety of information, such as instructions or commands relevant to audio encoding using machine learning schemes and a pre-encoded database. The database 130 may store data that may include instructions or commands (e.g., a high quality audio signal database, a high quality speech database, one or more audio signal parameters, one or more speech parameters) relevant to scanning-based determinations associated with audio encoding. The device 115 may retrieve the stored data from the database 130 via the base station 105 and/or the access point 110. The cloud platform 145 may be an example of a public or private cloud network. The device 115 may also be referred to here as a cloud client, which may access the cloud platform 145 over the network 120. In some examples, a cloud client may access the cloud platform 145 to store, manage, and process data associated machine learning schemes and pre-encoded databases to encode a digital representation of an audio signal using the machine learning schemes and pre-encoded databases.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. Communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
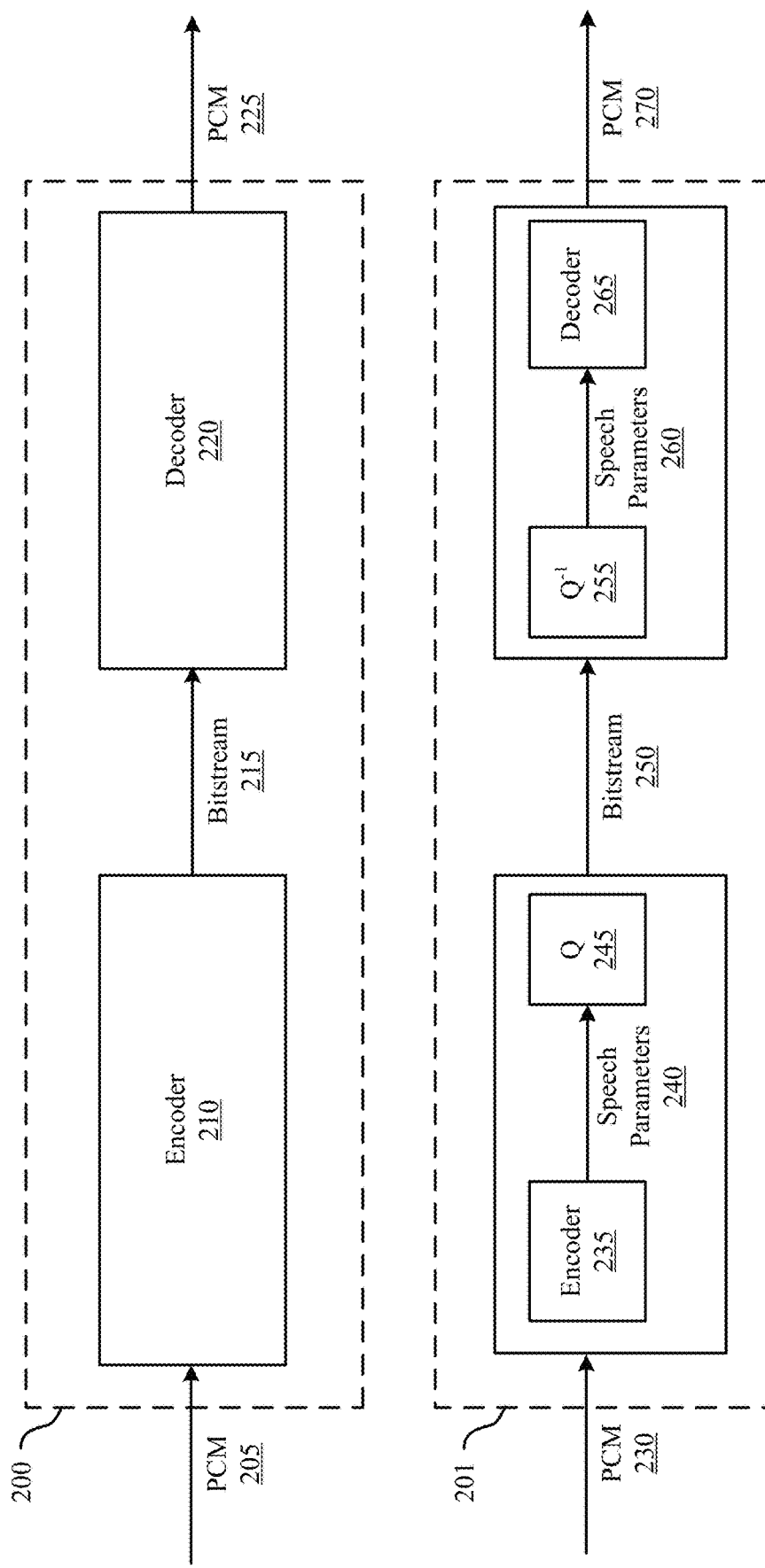
FIG. 2 illustrates example implementations of speech codecs that support speech coding in some systems.

FIG. 2 illustrates example implementations of speech codecs that support speech coding in some systems. "Speech coding" may refer to techniques that analyze an audio signal (e.g., a speech signal) and represent or "code" the signal either directly as a waveform or as a set of parameters. Using a received set of codes, a decoder may reconstruct or synthesize the signal. The techniques for encoding and decoding the signal may be interchangeably referred to as "speech coding," "voice coding," "speech compression," or "voice compression." In some examples, speech coding may reduce (compress) a transmission rate (or equivalently a bandwidth) of the signal, as well as reduce data storage requirements. In some examples, speech coding may use speech-specific parameter estimation using audio signal processing techniques to model a speech signal, in combination with data compression algorithms to represent the modeled parameters in a compact bitstream.

Speech coders may be of two types: waveform coders and vocoders. Waveform coders may encode and/or decode in a time-domain (e.g., a pulse code modulation (PCM), an adaptive multi-rate wideband (AMR-WB)) or the frequency-domain (e.g., sub-band coders, adaptive transform coders). Examples of vocoders may include linear predictive coders and formant coders. In some examples, AMR-WB may be a wideband speech audio coding standard developed based on AMR encoding, using similar methodology as algebraic code excited linear prediction (ACELP). EVS Codec, also a wideband speech audio coding standard, may enable improved voice quality, network capacity and advanced features for voice services over one or more radio access technologies, such as LTE and other radio access technologies.

In some examples, EVS may be a standard conversational codec offering up to 20 kHz audio bandwidth (e.g., capable of providing speech quality equivalent to audio such as stored music files, while offering high robustness to delay jitter and packet loss). Some systems implementing encoding and decoding operations may specify an encoder and decoder through reference fixed-point C code, where the encoder and decoder may have to conform to one or more specified test vectors.

According to some systems, a general assumption may be that bit-exactness may be equal to implementation following the reference code. For example, a system 200 may include an encoder 210 and a decoder 220. The encoder 210 may receive and convert an input signal (e.g., a PCM signal 205) into a bitstream 215. The decoder 220 may receive and convert the bitstream 215 to the PCM signal 225. In the example of FIG. 2, the PCM signal 205 and the PCM signal 225 may be identical or semi-identical (e.g., the PCM signal 205 and the PCM signal 225 may differ due to, for example, bit error or bit loss incurred during encoding or decoding).

In some examples, a system 201 may include an encoder 235, a quantizer 245, an inverse quantizer 255, and a decoder 220. The encoder 235 may receive an input signal (e.g., PCM signal 230) and output speech parameters 240 to the quantizer 245. Accordingly, the quantizer 245 may quantize the speech parameters 240 and output a bitstream 250. An inverse quantizer 255 may receive and convert the bitstream 250 to speech parameters 260, which may be decoded by a decoder 265 to generate a PCM signal 270. In the example, the PCM signal 230 and the PCM signal 270 may be identical or semi-identical (e.g., the PCM signal 230 and the PCM signal 270 may differ due to, for example, bit error or bit loss incurred during encoding or decoding).

Figure 3:
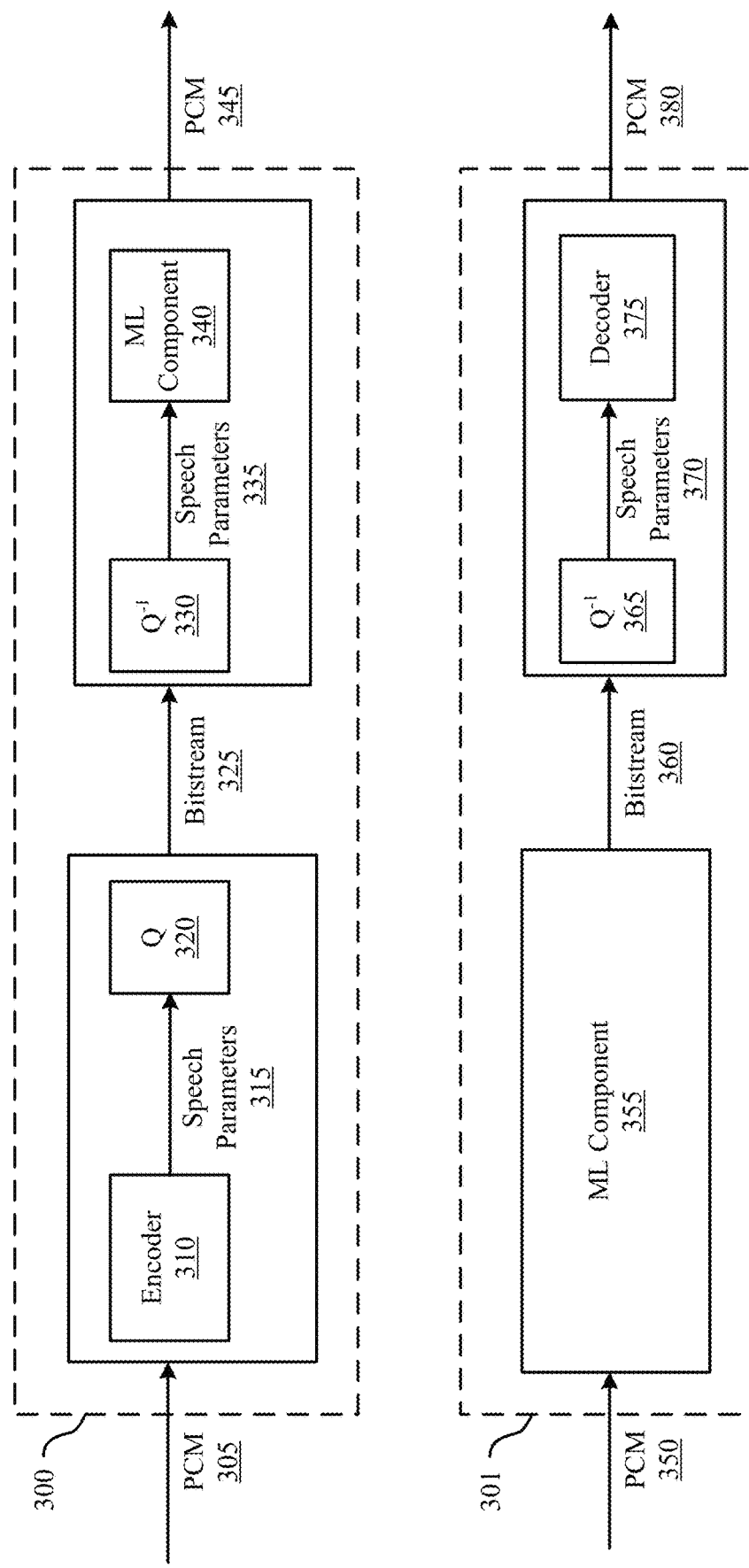
FIG. 3 illustrates example implementations of speech codecs that support machine learning algorithms for speech encoding in some systems.

FIG. 3 illustrates example implementations of speech codecs that support machine learning algorithms for speech encoding in some systems. In some examples, a system 300 may be an example of aspects of the system 201. The system 300 may include an encoder 310, a quantizer 320, and an inverse quantizer 330. Compared to the system 201, the system 300 may include a machine learning component 340. The encoder 310 may receive an input signal (e.g., a PCM signal 305) and output one or more speech parameters 315 to the quantizer 320. The quantizer 320 may further process the input signal by quantizing the speech parameters 315 and outputting a bitstream 325. The inverse quantizer 330 may receive and convert the bitstream 325 to one or more speech parameters 335, which may be decoded by the machine learning component 340 (e.g., a machine learning network, a neural network, a deep neural network, a machine learning network, a convolutional neural network) to generate a PCM signal 345. In the example of FIG. 3, the PCM signal 305 and the PCM signal 345 may be identical or semi-identical (e.g., the PCM signal 305 and the PCM signal 345 may differ due to, for example, bit error or bit loss incurred during encoding or decoding).

In some examples, the machine learning component 340 may be trained and implemented at a decoding stage to provide improvements to decoding. Additionally or alternatively, the machine learning component 340 may be trained and implemented at an encoding stage to provide improvements to encoding. For example, the machine learning component 340 may be trained and implemented to improve encoding efficiency while maintaining accuracy above a threshold (e.g., minimizing bit error or bit loss) during encoding. For example, a system 301 may include a machine learning component 355, an inverse quantizer 365, and a decoder 375. The machine learning component 355 may receive an input signal (e.g., a PCM signal 350) and output a bitstream 360. The inverse quantizer 365 may receive and convert the bitstream 360 to one or more speech parameters 370, which the decoder 375 may decode to generate a PCM signal 380. In the example of FIG. 3, the PCM signal 350 and the PCM signal 380 may be identical or semi-identical (e.g., the PCM signal 350 and the PCM signal 380 may differ due to, for example, bit error or bit loss incurred during encoding or decoding).

Some systems may suffer from poor reconstruction quality of an audio signal (e.g., a speech signal) because of a deficiency in models used for encoding or decoding the audio signal. Additionally these models may result in high processing time and hardware or processing complexity, all which may negatively impact user experience. Additionally, systems requiring run-time encoding may result in high memory usage, which may have adverse effects on device resources and performance capabilities of the systems.

Figure 4:
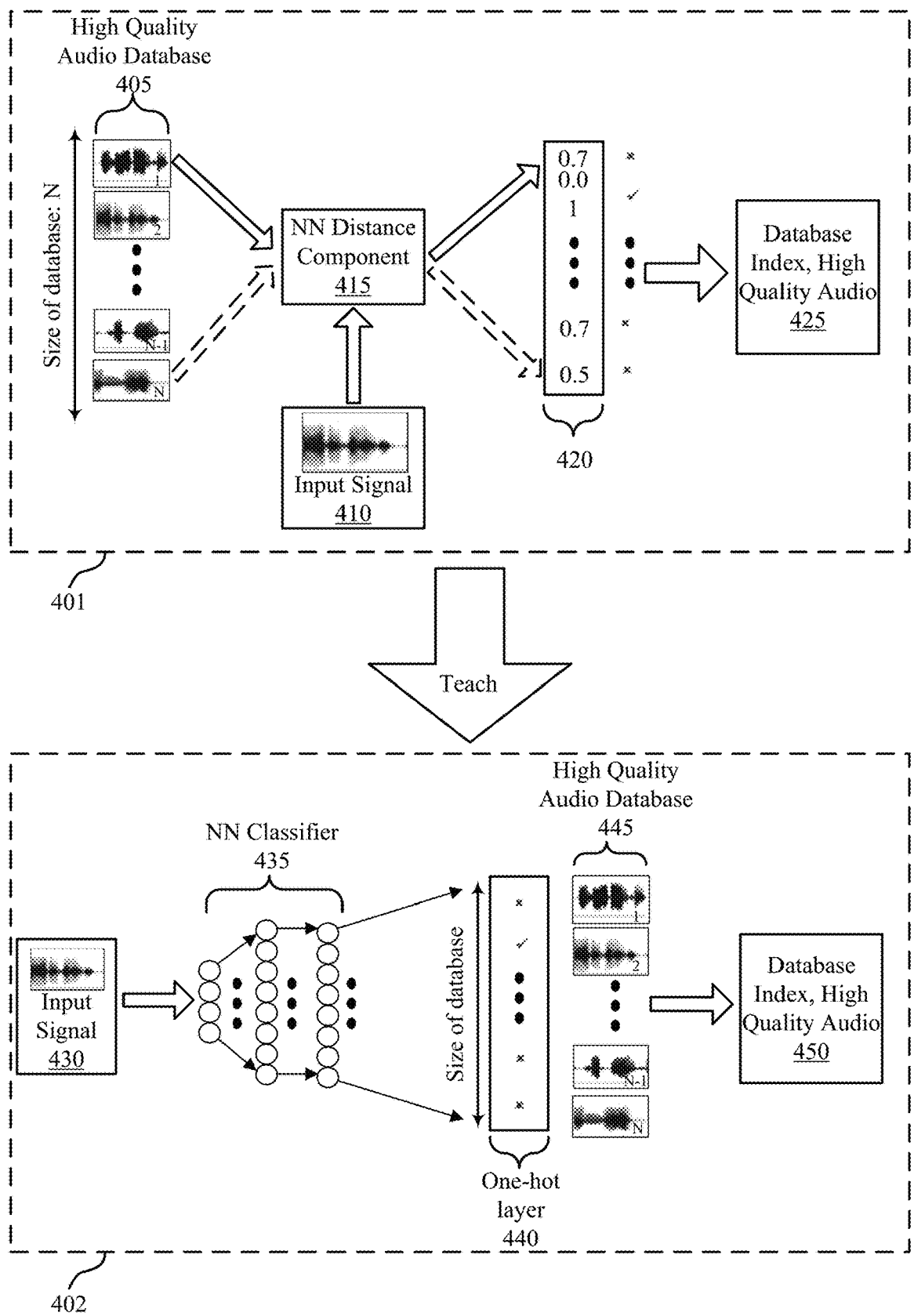
FIG. 4 illustrates an example of training a one-pass method that supports audio encoding using a pre-encoded database in accordance with aspects of the present disclosure.

FIG. 4 illustrates an example 400 of training a one-pass method that supports audio encoding using a pre-encoded database in accordance with aspects of the present disclosure. In some examples, scanning methods 401 and 402 may implement aspects of the system 100. The scanning method 401 may illustrate an example of a scanning method for standards-compatible audio signal encoding using a pre-encoded database (e.g., where the standards-compatible audio signal encoding may be referred to as "Asterix").

According to examples of aspects described herein, the scanning method 401 may represent a received input signal 410 (e.g., an audio signal, a speech input) by selecting segments associated with the input signal 410 (e.g., segments that may represent the input signal 410) from a high quality audio database 405 having high quality audio signals. In some examples, an audio signal having "high quality" may be defined as an audio signal satisfying a quality threshold (e.g., being above a quality threshold). The threshold may include one or more of a bandwidth threshold, a power level threshold, a sampling frequency threshold (e.g., sample rate threshold, for example, the number of times samples of a signal are acquired per second during a process converting the signal from analog to digital), a bit depth threshold, etc.

In some examples, the scanning method 401 may include scanning each frame in an input database (e.g., the high quality audio database 405). For example, the scanning method 401 may including scanning frames 1 through N, where N may be an integer value) to identify frames that may match one or more input frames of the input signal 410. For example, in the scanning method 401, a neural network distance component 415 may determine one or more neural network distances 420 with respect to matching frames drawn from the high quality audio database 405. In an example, the neural network distance component 415 may add one or more neural network distances 420 to the database index 425.

The scanning method 402 may illustrate an example of a one-pass method for standards-compatible audio signal encoding using a pre-encoded database. In some examples, the scanning method 401 may be used to teach or train a network (e.g., a neural network classifier 435) of the scanning method 402, such that the network may estimate an outcome of a scanning search (e.g., a neural network classifier 435 may be trained to match scanning approach decisions). In an example, for an input frame of an input signal 430 (e.g., an audio signal, a speech input), the scanning method 402 may determine results for an entire database (e.g., identify frames from the entire high quality audio database 445 that may match input frames of the input signal 430) in a single encoding pass. In some examples, the scanning method 402 may include a one-hot layer 440 in determining the results. For example, the neural network classifier 435 may refer to the one-hot layer 440 to identify, from the high quality audio database 445, one or more frames of audio signals stored in the high quality audio database 445 which match input frames of input signal 430. In an example, the one-hot layer 440 may include a 1×N matrix (vector) including one or more indicators (e.g., numerical identifiers) used to distinguish elements in the matrix from one another.

In some examples, the scanning method 402 may converge on match results faster (e.g., 100× faster) and more efficiently compared to the scanning method 401. For example, the scanning method 401, with N inferences per input frame, may converge at a rate of 27 Tera multiply-accumulate (TMAC) operations per second (27 TMAC operations/second). Contrary, the scanning method 402, with one inference per input frame, may converge at a rate of 328 Giga MAC (GMAC) operations per second (328 GMAC operations/second). The scanning method 402 may therefore provide improvements to efficiency related to encoding and decoding of audio signals.

Figure 5:
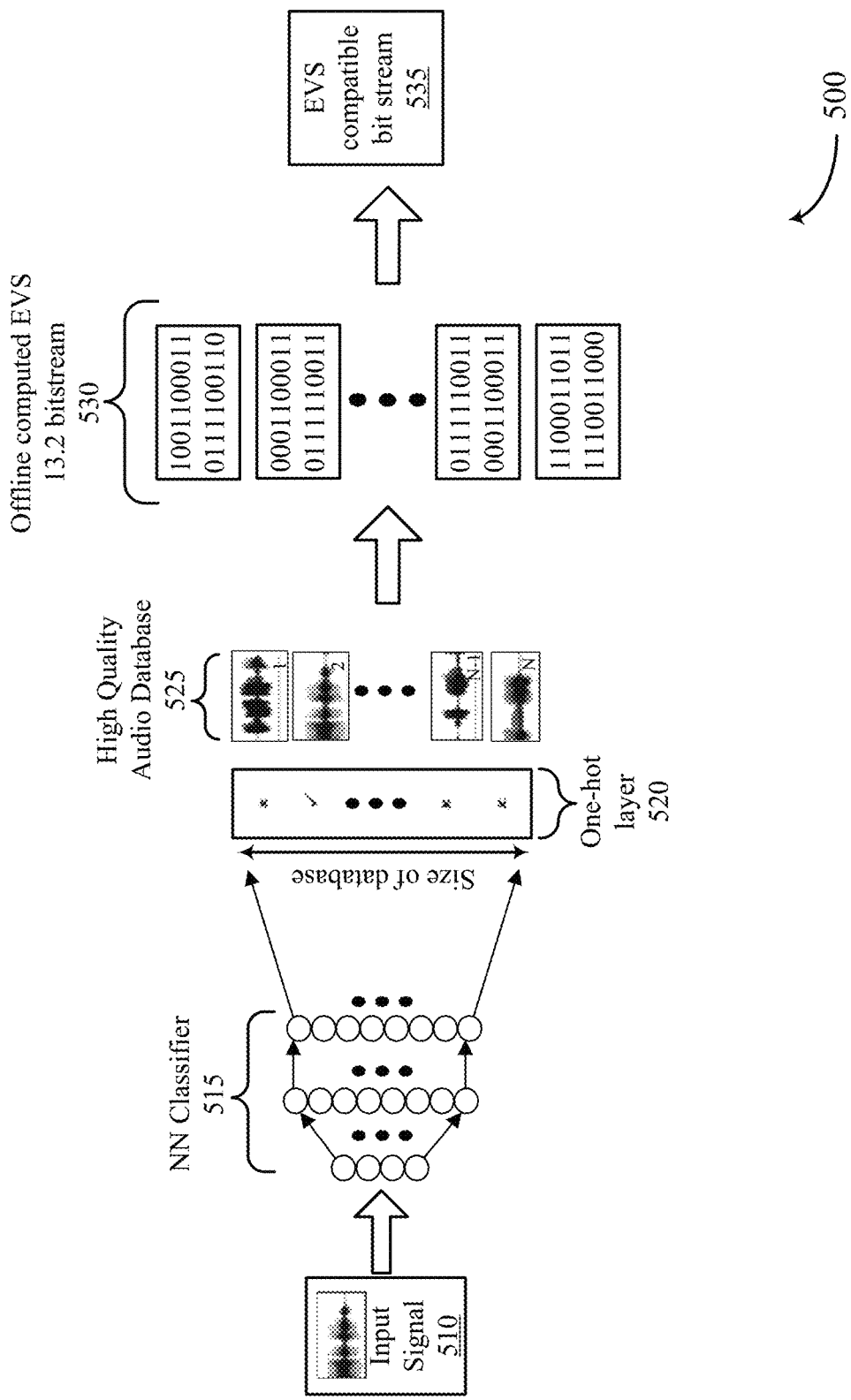
FIG. 5 illustrates an example of a one-pass method that supports audio encoding using a pre-encoded database in accordance with aspects of the present disclosure.

FIG. 5 illustrates an example of a one-pass method 500 that supports audio encoding using a pre-encoded database in accordance with aspects of the present disclosure. In some examples, the one-pass method 500 may implement aspects of the system 100 and the scanning method 401. According to examples of aspects of the one-pass method 500, the device 115 may receive a digital representation of an audio signal (e.g., an input signal 510). In an example, the audio signal (e.g., the input signal 510) may include a PCM representation of a speech signal. In some examples, the device 115 may identify, based on receiving the digital representation of the audio signal, a database that is pre-encoded according to a coding standard and that includes a quantity of digital representations of other audio signals. For example, the device 115 may identify a high quality audio database 525 having digital representations 1 through N of audio signals, where N may be a positive value.

In identifying the database, the device 115 may select the database based at least in part on a criterion (e.g., a format of the audio signal, a transmission rate associated with a transmission of the audio signal, or a network associated with the transmission of the audio signal). For example, the device 115 may select the high quality audio database 525 based on a format, a transmission rate, or a network associated with the transmission of the input signal 510. In some examples, the high quality audio database 525 may include one or more digital audio signals having a "high quality" (i.e., satisfying a quality threshold, for example, being above a quality threshold). The threshold may include one or more of a bandwidth threshold, a power level threshold, a sampling frequency threshold (i.e., a sample rate, for example, a number of times samples of a signal are taken per second during a process converting the signal from analog to digital), a bit depth threshold, etc. In some examples, the format may include a coding format (e.g., EVS, AMR-WB or other code excited linear prediction (CELP) coder) or coding mode (e.g., EVS with no long term prediction, AMR-WB or CELP coder where pitch gain may be set to zero).

In some examples, the device 115 may encode the digital representation of the audio signal using a machine learning scheme (e.g., a neural network classifier 515) and information from the database pre-encoded according to the coding standard. Additionally or alternatively, the device 115 may encode the digital representation jointly according to the coding standard and an additional coding standard different from the coding standard. In an example, the neural network classifier 515 may encode the input signal 510 based on the high quality audio database 525.

In encoding the digital representation of the audio signal, the device 115 may estimate a scan result associated with the digital representation of the audio signal and the database. In an example, as described herein, the neural network classifier 515 may be trained to match scanning approach decisions (e.g., scanning method decisions) for one or more digital representations of one or more audio signals with respect to a database. Accordingly, in some examples, the neural network classifier 515 may refer to a one-hot layer 520 to identify (e.g., estimate a scan result), from the high quality audio database 525, frames from the entire high quality audio database 525 (e.g., among frames 1 through N) which match input frames of the audio signal (e.g., input signal 510).

In some examples, the device 115 may generate a bitstream of the digital representation (e.g., offline computed EVS 13.2 bitstream 530) that is compatible with the coding standard (e.g., EVS, AMR-WB) based at least in part on encoding the digital representation of the audio signal. In some examples, the device 115 may output a representation of the bitstream (e.g., an EVS compatible bitstream 535). For example, the device 115 may generate the EVS compatible bitstream 535 without requiring actual run-time EVS encoding.

The device 115 (or another device 115) may pre-encode (e.g., compress) one or more databases (e.g., the high quality audio database 525) offline according to a coding standard (e.g. EVS, AMR-WB), prior to the device 115 receiving a digital representation of an audio signal. For example, the device 115 may pre-encode a database based on one or more of a coding mode or a pitch gain associated with a coding standard (e.g., EVS having a coding mode with no LTP, AMR-WB or other Code Excited Linear Prediction (CELP) coders, etc.).

In pre-encoding a database according to a coding standard, the device 115 (or another device 115) may encode a set of packets according to the coding standard and insert a set of reset frames between one or more of the packets, where one or more of the packets may correspond to a database frame in the database. In some examples, the device 115 may determine a set of reference points associated with the database based on the set of packets and assign the set of reference points in the database based at least in part on a parameter including a distance between reset frames of the set of reset frames. The device 115 may, for example, insert the set of reset frames based at least in part on the assigning. In some examples, the distance may be a selected distance value (e.g., selected based on one or more parameters associated with the coding standard). In some examples, the device 115 may determine a set of continuous packets of the encoded set of packets, insert a first reset frame prior to a first packet of the set of continuous packets, and insert a second reset frame after a last packet of the set of continuous packets of the encoded set of packets.

In encoding the digital representation of the audio signal, the device 115 may ignore, based on the set of reset frames, one or more dependencies at least two of the encoded set of packets. In some examples, the device 115 may encode a current input frame of the audio signal based on the ignoring. Accordingly, the device 115 may process audio signals using a machine learning scheme (e.g., the neural network classifier 515) and a database that is pre-encoded according to a coding standard (e.g., the high quality audio database 525), as described herein. Additionally or alternatively, the device 115 may process audio signals using a set of weighting coefficients integrated within the machine learning scheme. In an example, the weighting coefficients integrated within the machine learning scheme may correspond to a non-pre-encoded database associated with a coding standard (e.g., a database different from the high quality audio database 525). In an example, the machine learning scheme may use machine learning to integrate a compressed version of the non-pre-encoded database.

According to examples of aspects described herein, the device 115 may receive a digital representation of a second audio signal (e.g., another input signal 510) and identify, based on receiving the digital representation of the second audio signal, a set of weighting coefficients of the machine learning scheme (e.g., the neural network classifier 515), where the set of weighting coefficients may be associated with an additional coding standard different from the coding standard (e.g., different from the coding standard associated with the high quality audio database 525). The device 115 may encode the digital representation of the second audio signal using the machine learning scheme based on one or more weighting coefficients of the set of weighting coefficients, generate a second bitstream of the digital representation of the second audio signal that is compatible with the additional coding standard based on the encoding of the digital representation of the second audio signal, and output a representation of the second bitstream.

In some examples, the machine learning scheme (e.g., the neural network classifier 515) may directly generate a bitstream of the digital representation of the second audio signal and output a representation of the bitstream based on the set of weighting coefficients, without an additional encoder (e.g., without the one-hot layer 520 and the high quality audio database 525).

Aspects of the subject matter described herein may be implemented to realize one or more advantages. For example, pre-encoding a database according to a coding standard may be implemented to realize one or more advantages associated with memory propagation. For example, codecs may exploit inter-frame redundancies for maximum coding efficiency, where each coded packet in the pre-encoded database may depend on both a current input frame and previous coded frames, e.g., use of long term prediction. According to examples of aspects described herein, the system (e.g., the system 100, the device 115) may include features for using pre-computed packets by breaking or ignoring such dependencies (e.g., by an insertion of break-points, or reference points). In some examples, the system (e.g., the system 100, the device 115) may utilize coding modes in EVS which have no long term prediction. In some examples, the device 115 may set pitch gain to zero during encoding using AMR-WB or other CELP coders. In some examples, the system (e.g., the system 100, the device 115) may minimize perceptual impact of breaking such dependencies by constraining database jumps (e.g., based on breaks) to occur at speech transitions associated with an input signal (e.g., the input signal 510).

The system (e.g., the system 100, the device 115) may impose one or more parameters associated with the distance between break-points. In some examples, the system (e.g., the system 100, the device 115) may specify or enforce that the distance between break-points is no more than N frames. For example, the system (e.g., the system 100, the device 115) may represent each database frame by N different packets, for each possible number of consecutive frames since the last break-point. In an example, N may be a value ranging from 5 to 10.

Accordingly, examples of aspects described herein may provide for offline encoding of an input audio signal (e.g., PCM representation of an audio signal, a speech signal) to a standard-compatible bitstream offline, without using a standard encoder online. The device 115 may encode an input audio signal (e.g., the input signal 510) in one-pass, offline.

According to examples of aspects described herein, for one inference/frame, the system (e.g., the system 100, the device 115) may achieve a rate of 30 GMACs/second for a 15 minute duration speech database (e.g., this can be heavily optimized). Memory for storing bitstreams may be 15*60*50*264 bits=1.5 MBytes (e.g., broadly comparable to EVS). According to examples of aspects described herein, the system (e.g., the system 100, the device 115) may output sets of coded bitstreams as clearly defined subsets of the total space. According to examples of aspects described herein, the system (e.g., the system 100, the device 115) may utilize aspects of the encoding schemes and pre-encoding schemes based on whether complexity, memory usage, and quality satisfy a threshold (e.g., whether complexity and/or memory usage levels are below a threshold, whether quality is high). According to examples of aspects described herein, the system (e.g., the system 100, the device 115) may implement a codec in a network processor (NPU) rather than a standard digital signal processor (DSP). Additionally or alternatively, examples of aspects described herein may be applied to video coding, or a combination of audio and video coding.

Figure 6:
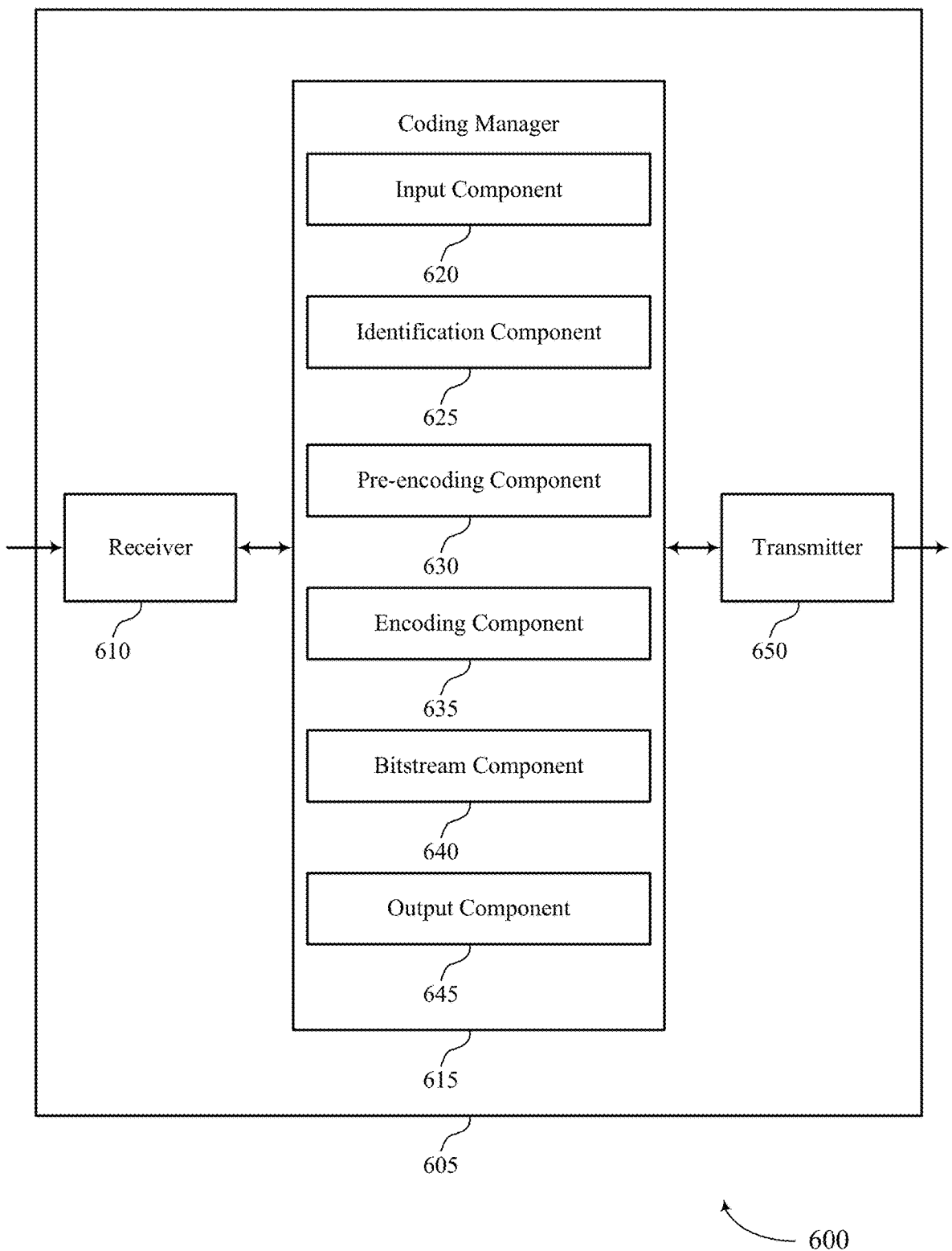
FIG. 6 shows a block diagram of a device that supports audio encoding using a pre-encoded database in accordance with aspects of the present disclosure.

FIG. 6 shows a block diagram 600 of a device 605 that supports audio encoding (e.g., speech encoding) using a pre-encoded database in accordance with aspects of the present disclosure. The device 605 may be an example of aspects of a device 115 as described herein. The device 605 may include a receiver 610, a coding manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to audio encoding (e.g., speech encoding) using a pre-encoded database, etc.). Information may be passed on to other components of the device 605. The receiver 610 may be an example of aspects of the transceiver 720 described with reference to FIG. 7. The receiver 610 may utilize a single antenna or a set of antennas.

The coding manager 615 may include an input component 620, an identification component 625, a pre-encoding component 630, an encoding component 635, a bitstream component 640, and an output component 645. The coding manager 615 may be an example of aspects of the coding manager 710 described herein.

The input component 620 may receive a digital representation of an audio signal. In some examples, the input component 620 may receive a digital representation of a second audio signal. The identification component 625 may identify, based on receiving the digital representation of the audio signal, a database that is pre-encoded according to a coding standard and that includes a quantity of digital representations of other audio signals. In some examples, the identification component 625 may identify, based on receiving the digital representation of the second audio signal, a set of weighting coefficients of the machine learning scheme, where the set of weighting coefficients are associated with an additional coding standard different from the coding standard.

The pre-encoding component 630 may pre-encode the database according to the coding standard prior to receiving the digital representation of the audio signal. In some examples, the pre-encoding component 630 may select the pre-encoded database based on a criterion, where identifying the database pre-encoded according to the coding standard is based on the selecting. In some cases, the criterion may include one or more of a format of the audio signal, a transmission rate associated with a transmission of the audio signal, or a network associated with the transmission of the audio signal. In some examples, the pre-encoding component 630 may encode a set of packets according to the coding standard, where one or more packets of the set of packets correspond to a database frame in the database. In some examples, the pre-encoding component 630 may insert a set of reset frames between one or more packets of the encoded set of packets. In some examples, the pre-encoding component 630 may determine a set of reference points associated with the database based on the set of packets. In some examples, the pre-encoding component 630 may assign the set of reference points in the database based on a parameter including a distance between reset frames of the set of reset frames, where inserting the set of reset frames may be based on the assigning. In some examples, the pre-encoding component 630 may select a value of the distance from a range of distance values, where assigning the set of reference points in the database based on the selecting.

In some examples, the pre-encoding component 630 may determine a set of continuous packets of the encoded set of packets, where inserting the set of reset frames between the one or more packets of the encoded set of packets includes inserting a first reset frame prior to a first packet of the set of continuous packets of the encoded set of packets, and inserting a second reset frame after a last packet of the set of continuous packets of the encoded set of packets. In some examples, the pre-encoding component 630 may determine one or more of a coding mode or a pitch gain associated with the coding standard, where pre-encoding the database may be based on one or more of the coding mode or the pitch gain associated with the coding standard.

The encoding component 635 may encode the digital representation of the audio signal using a machine learning scheme and information from the database pre-encoded according to the coding standard. In some examples, the encoding component 635 may ignore, based on the set of reset frames, one or more dependencies of a packet of the encoded set of packets with respect to one or more other packets of the encoded set of packets. In some examples, the encoding component 635 may encode a current input frame of the audio signal based on the ignoring. In some examples, the encoding component 635 may estimate a scan result associated with the digital representation of the audio signal and the database, where encoding the digital representation of the audio signal is based on the scan result. In some examples, the encoding component 635 may encode the digital representation jointly according to the coding standard and an additional coding standard different from the coding standard. In some examples, the encoding component 635 may train the machine learning scheme to match one or more scanning approach decisions for one or more digital representations of one or more audio signals with respect to the database, where estimating the scan result is based on the training. In some examples, the encoding component 635 may encode the digital representation of the second audio signal using the machine learning scheme based on one or more weighting coefficients of the set of weighting coefficients.

The bitstream component 640 may generate a bitstream of the digital representation that is compatible with the coding standard based on encoding the digital representation of the audio signal. In some examples, the bitstream component 640 may generate a second bitstream of the digital representation of the second audio signal that is compatible with the additional coding standard based on the encoding of the digital representation of the second audio signal. The output component 645 may output a representation of the bitstream. In some examples, the output component 645 may output a representation of the second bitstream.

The coding manager 615 as described herein may be implemented to realize one or more potential advantages. One implementation may allow the device 115 to provide techniques which may support audio encoding using a pre-encoded database, among other advantages. For example, the device 115 may include features for reducing processing time, complexity, memory usage, and power usage of systems compared to some encoding processes (e.g., run-time encoding), as the device 115 may encode a digital representation of an audio signal (e.g., a speech signal) using a machine learning scheme and a database that is pre-encoded offline according to a coding standard. The coding manager 615 may be an example of aspects of the coding manager 710 described herein.

The coding manager 615, or its sub-components, may be implemented in hardware, code (e.g., software or firmware) executed by a processor, or any combination thereof. If implemented in code executed by a processor, the functions of the coding manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The coding manager 615, or its sub-components, may be physically located at various positions, including being distributed such that portions of functions are implemented at different physical locations by one or more physical components. In some examples, the coding manager 615, or its sub-components, may be a separate and distinct component in accordance with various aspects of the present disclosure. In some examples, the coding manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 650 may transmit signals generated by other components of the device 605. In some examples, the transmitter 650 may be collocated with a receiver 610 in a transceiver module. For example, the transmitter 650 may be an example of aspects of the transceiver 720 described with reference to FIG. 7. The transmitter 650 may utilize a single antenna or a set of antennas.

Figure 7:
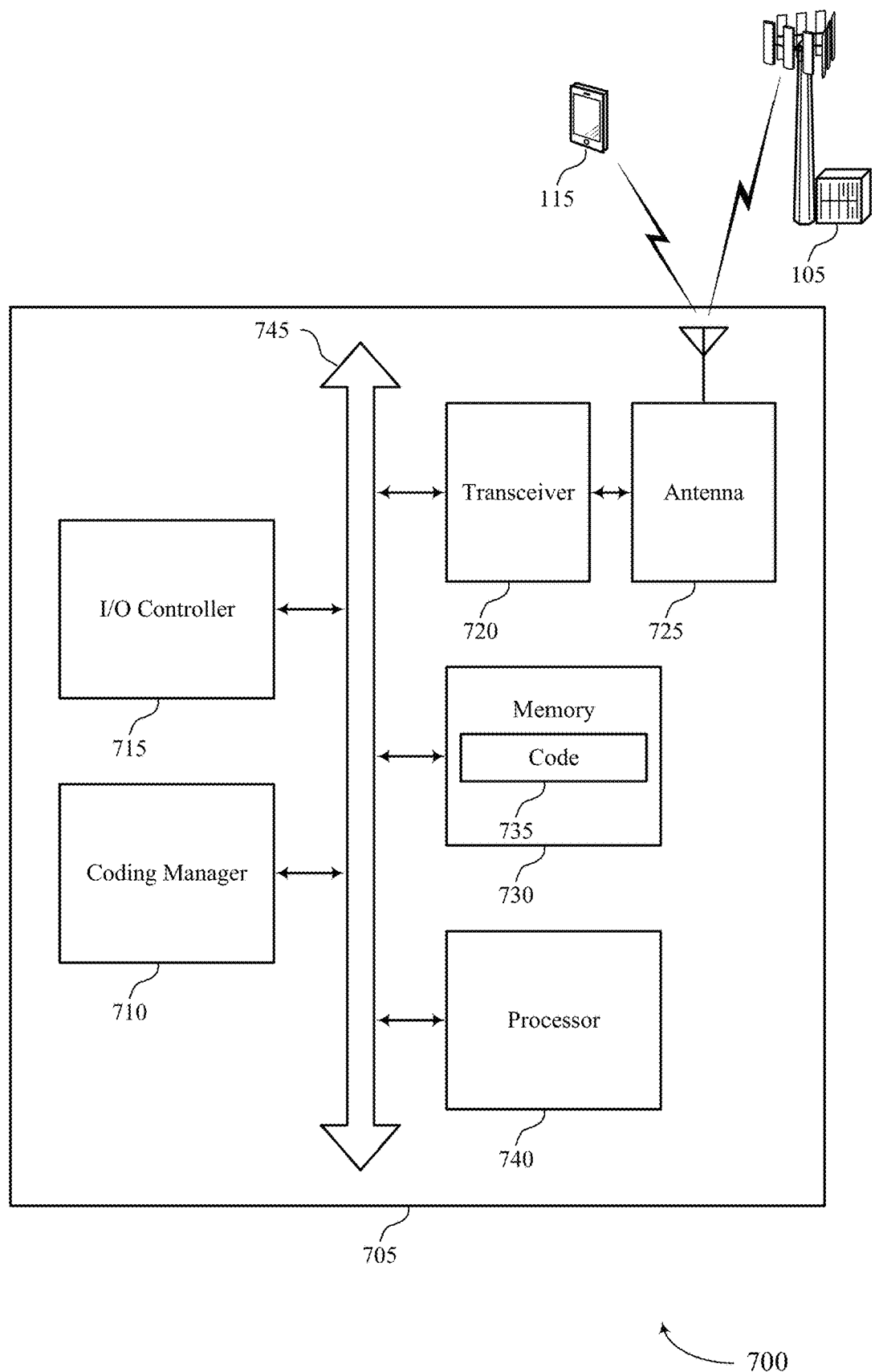
FIG. 7 shows a diagram of a system including a device that supports audio encoding using a pre-encoded database in accordance with aspects of the present disclosure.

FIG. 7 shows a diagram of a system 700 including a device 705 that supports audio encoding (e.g., speech encoding) using a pre-encoded database in accordance with aspects of the present disclosure. The device 705 may be an example of or include the components of the device 605 or a device 115 as described herein. The device 705 may include components for bi-directional voice and data communications including components for transmitting and receiving communications, including a coding manager 710, an I/O controller 715, a transceiver 720, an antenna 725, memory 730, and a processor 740. These components may be in electronic communication via one or more buses (e.g., bus 745).

The coding manager 710 may receive a digital representation of an audio signal, identify, based on receiving the digital representation of the audio signal, a database that is pre-encoded according to a coding standard and that includes a quantity of digital representations of other audio signals, encode the digital representation of the audio signal using a machine learning scheme and information from the database pre-encoded according to the coding standard, generate a bitstream of the digital representation that is compatible with the coding standard based on encoding the digital representation of the audio signal, and output a representation of the bitstream.

The coding manager 710 may receive a digital representation of a second audio signal, identify, based on receiving the digital representation of the second audio signal, a set of weighting coefficients of the machine learning scheme, where the set of weighting coefficients may be associated with an additional coding standard different from the coding standard, encode the digital representation of the second audio signal using the machine learning scheme based on one or more weighting coefficients of the set of weighting coefficients, generate a second bitstream of the digital representation of the second audio signal that may be compatible with the additional coding standard based on the encoding of the digital representation of the second audio signal, and output a representation of the second bitstream.

The coding manager 710 or one or more components of the coding manager 710 described herein may perform and/or be a means for receiving a digital representation of an audio signal. The coding manager 710 or one or more components of the coding manager 710 described herein may perform and/or be a means for identifying, based at least in part on receiving the digital representation of the audio signal, a database that is pre-encoded according to a coding standard and that comprises a quantity of digital representations of other audio signals. The coding manager 710 or one or more components of the coding manager 710 described herein may perform and/or be a means for encoding the digital representation of the audio signal using a machine learning scheme and information from the database pre-encoded according to the coding standard. The coding manager 710 or one or more components of the coding manager 710 described herein may perform and/or be a means for generating a bitstream of the digital representation that is compatible with the coding standard based at least in part on encoding the digital representation of the audio signal. The coding manager 710 or one or more components of the coding manager 710 described herein may perform and/or be a means for outputting a representation of the bitstream.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS, ANDROID, MS-DOS, MS-WINDOWS, OS/2, UNIX, LINUX, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting audio encoding (e.g., speech encoding) using a pre-encoded database).

The code 735 may include instructions to implement aspects of the present disclosure, including instructions to support encoding. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
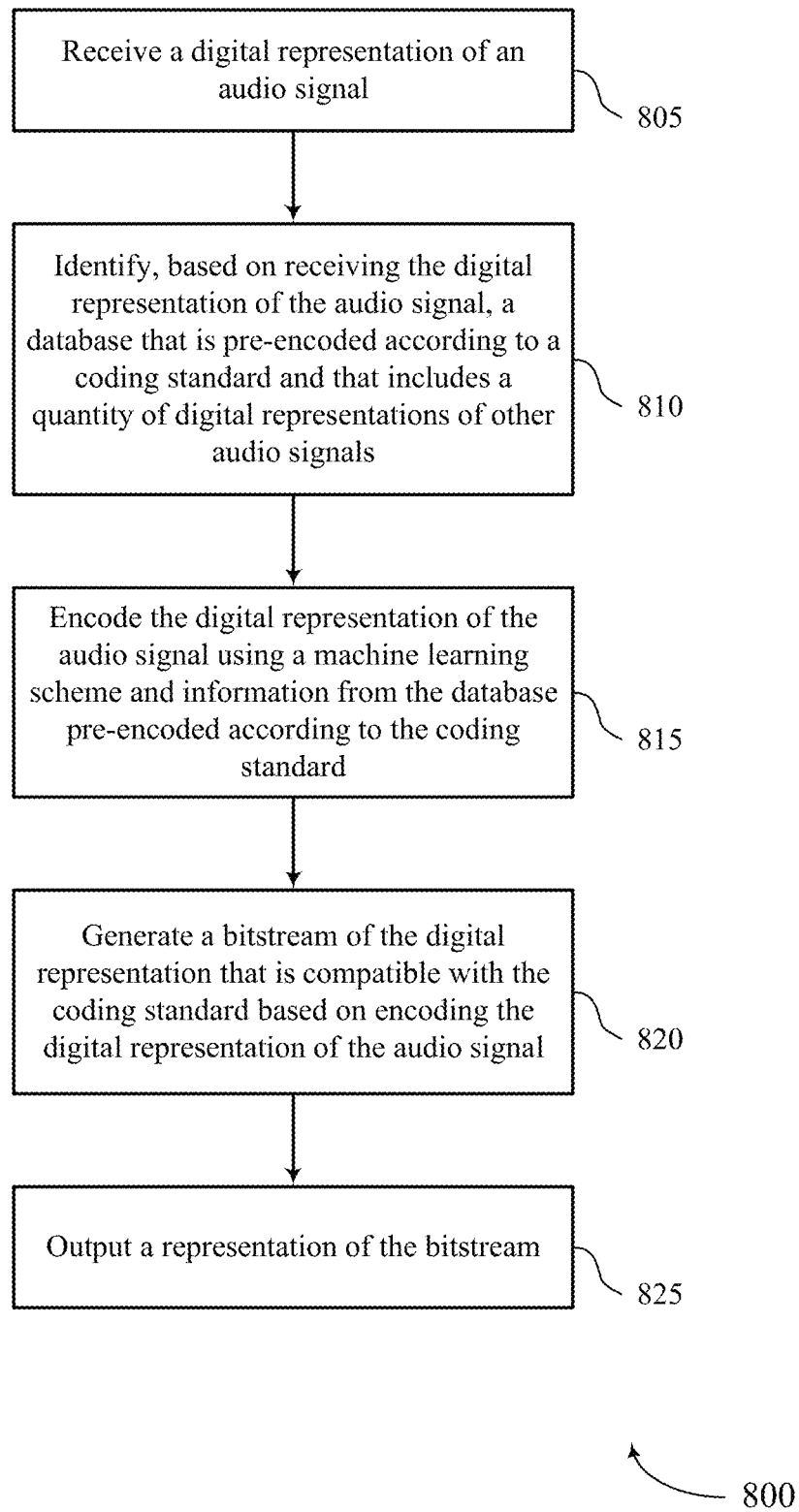
FIGS. 8 through 10 show flowcharts illustrating methods that support audio encoding using a pre-encoded database in accordance with aspects of the present disclosure.

FIG. 8 shows a flowchart illustrating a method 800 that supports audio encoding (e.g., speech encoding) using a pre-encoded database in accordance with aspects of the present disclosure. The operations of method 800 may be implemented by a device 115 or its components as described herein. For example, the operations of method 800 may be performed by a coding manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 805, the UE may receive a digital representation of an audio signal. The operations of 805 may be performed according to the methods described herein. In some examples, aspects of the operations of 805 may be performed by an input component as described with reference to FIGS. 6 and 7.

At 810, the UE may identify, based on receiving the digital representation of the audio signal, a database that is pre-encoded according to a coding standard and that includes a quantity of digital representations of other audio signals. The operations of 810 may be performed according to the methods described herein. In some examples, aspects of the operations of 810 may be performed by a pre-encoding component as described with reference to FIGS. 6 and 7.

At 815, the UE may encode the digital representation of the audio signal using a machine learning scheme and information from the database pre-encoded according to the coding standard. The operations of 815 may be performed according to the methods described herein. In some examples, aspects of the operations of 815 may be performed by an encoding component as described with reference to FIGS. 6 and 7.

At 820, the UE may generate a bitstream of the digital representation that is compatible with the coding standard based on encoding the digital representation of the audio signal. The operations of 820 may be performed according to the methods described herein. In some examples, aspects of the operations of 820 may be performed by a bitstream component as described with reference to FIGS. 6 and 7.

At 825, the UE may output a representation of the bitstream. The operations of 825 may be performed according to the methods described herein. In some examples, aspects of the operations of 825 may be performed by an output component as described with reference to FIGS. 6 and 7.

Figure 9:
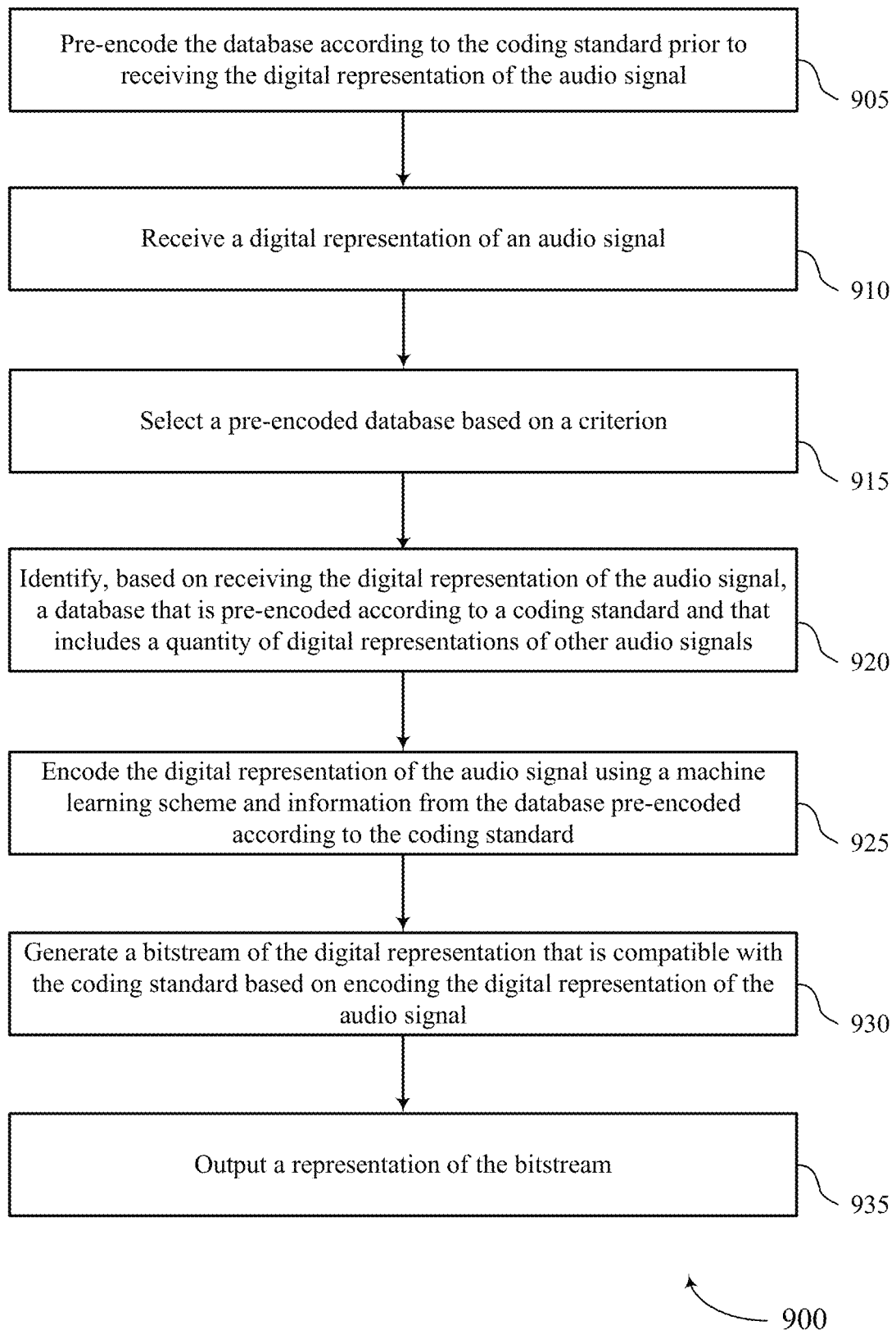

FIG. 9 shows a flowchart illustrating a method 900 that supports audio encoding (e.g., speech encoding) using a pre-encoded database in accordance with aspects of the present disclosure. The operations of method 900 may be implemented by a device 115 or its components as described herein. For example, the operations of method 900 may be performed by a coding manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 905, the UE may pre-encode a database according to a coding standard prior to receiving a digital representation of an audio signal. The operations of 905 may be performed according to the methods described herein. In some examples, aspects of the operations of 905 may be performed by a pre-encoding component as described with reference to FIGS. 6 and 7.

At 910, the UE may receive a digital representation of an audio signal. The operations of 910 may be performed according to the methods described herein. In some examples, aspects of the operations of 910 may be performed by an input component as described with reference to FIGS. 6 and 7.

At 915, the UE may select a pre-encoded database based on a criterion, where identifying the database pre-encoded according to the coding standard is based on the selecting. The operations of 920 may be performed according to the methods described herein. In some examples, aspects of the operations of 920 may be performed by a pre-encoding component as described with reference to FIGS. 6 and 7.

At 920, the UE may identify, based on receiving the digital representation of the audio signal, a database that is pre-encoded according to a coding standard and that includes a quantity of digital representations of other audio signals. The operations of 920 may be performed according to the methods described herein. In some examples, aspects of the operations of 920 may be performed by a pre-encoding component as described with reference to FIGS. 6 and 7.

At 925, the UE may encode the digital representation of the audio signal using a machine learning scheme and information from the database pre-encoded according to the coding standard. The operations of 925 may be performed according to the methods described herein. In some examples, aspects of the operations of 925 may be performed by an encoding component as described with reference to FIGS. 6 and 7.

At 930, the UE may generate a bitstream of the digital representation that is compatible with the coding standard based on encoding the digital representation of the audio signal. The operations of 930 may be performed according to the methods described herein. In some examples, aspects of the operations of 930 may be performed by a bitstream component as described with reference to FIGS. 6 and 7.

At 935, the UE may output a representation of the bitstream. The operations of 935 may be performed according to the methods described herein. In some examples, aspects of the operations of 935 may be performed by an output component as described with reference to FIGS. 6 and 7.

Figure 10:
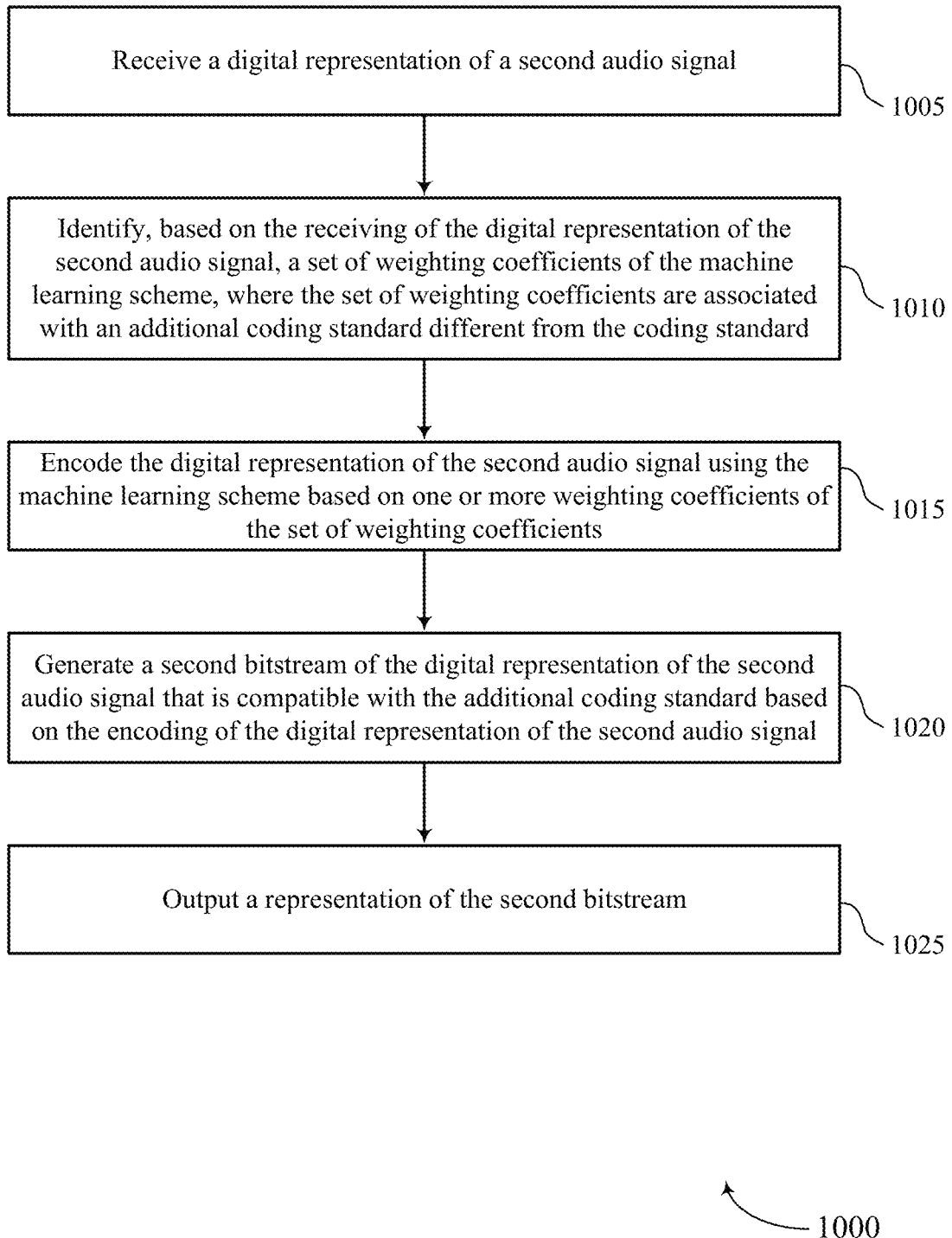

FIG. 10 shows a flowchart illustrating a method 1000 that supports audio encoding (e.g., speech encoding) using a pre-encoded database in accordance with aspects of the present disclosure. The operations of method 1000 may be implemented by a device 115 or its components as described herein. For example, the operations of method 1000 may be performed by a coding manager as described with reference to FIGS. 6 and 7. The operations of method 1000 as implemented by the UE or its components may promote audio encoding using a pre-encoded database which may provide reduced processing time, complexity, memory usage, and power usage of systems, among other advantages. In some examples, a UE may execute a set of instructions to control the functional elements of the UE to perform the functions described below. Additionally or alternatively, a UE may perform aspects of the functions described below using special-purpose hardware.

At 1005, the UE may receive a digital representation of a second audio signal. The operations of 1005 may be performed according to the methods described herein. In some examples, aspects of the operations of 1005 may be performed by an input component as described with reference to FIGS. 6 and 7.

At 1010, the UE may identify, based on the receiving of the digital representation of the second audio signal, a set of weighting coefficients of the machine learning scheme, where the set of weighting coefficients are associated with an additional coding standard different from the coding standard. The operations of 1010 may be performed according to the methods described herein. In some examples, aspects of the operations of 1010 may be performed by an identification component as described with reference to FIGS. 6 and 7.

At 1015, the UE may encode the digital representation of the second audio signal using the machine learning scheme based on one or more weighting coefficients of the set of weighting coefficients. The operations of 1015 may be performed according to the methods described herein. In some examples, aspects of the operations of 1015 may be performed by an encoding component as described with reference to FIGS. 6 and 7.

At 1020, the UE may generate a second bitstream of the digital representation of the second audio signal that is compatible with the additional coding standard based on the encoding of the digital representation of the second audio signal. The operations of 1020 may be performed according to the methods described herein. In some examples, aspects of the operations of 1020 may be performed by a bitstream component as described with reference to FIGS. 6 and 7.

At 1025, the UE may output a representation of the second bitstream. The operations of 1025 may be performed according to the methods described herein. In some examples, aspects of the operations of 1025 may be performed by an output component as described with reference to FIGS. 6 and 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
    receiving a digital representation of an audio signal;
    identifying, based at least in part on receiving the digital representation of the audio signal, a database that is pre-encoded offline according to a coding standard and that comprises a quantity of digital representations of other audio signals, wherein the quantity of digital representations of other audio signals satisfies a set of thresholds, the set of thresholds comprising one or more of a power level threshold, a sampling frequency threshold, or a bit depth threshold;
    encoding, offline, the digital representation of the audio signal using a machine learning scheme and information from the database pre-encoded according to the coding standard to match one or more frames of the digital representation of the audio signal to one or more frames from the database, wherein the encoded digital representation of the audio signal comprises one or more pre-encoded frames from the database that correspond to the one or more frames that match the digital representation of the audio signal;
    generating a bitstream of the digital representation that is compatible with the coding standard and irrespective of online encoding based at least in part on encoding the digital representation of the audio signal offline; and
    outputting a representation of the bitstream.

2. The method of claim 1, further comprising:
    pre-encoding the database according to the coding standard prior to receiving the digital representation of the audio signal; and
    selecting the pre-encoded database based at least in part on a criterion, wherein identifying the database pre-encoded according to the coding standard is based at least in part on the selecting.

3. The method of claim 2, wherein the criterion comprises one or more of a format of the audio signal, a transmission rate associated with a transmission of the audio signal, or a network associated with the transmission of the audio signal.

4. The method of claim 2, wherein pre-encoding the database according to the coding standard comprises:
    encoding a set of packets according to the coding standard, wherein one or more packets of the set of packets correspond to a database frame in the database; and
    inserting a set of reset frames between one or more packets of the encoded set of packets.

5. The method of claim 4, further comprising:
    determining a set of reference points associated with the database based at least in part on the set of packets; and
    assigning the set of reference points in the database based at least in part on a parameter comprising a distance between reset frames of the set of reset frames, wherein inserting the set of reset frames is based at least in part on the assigning.

6. The method of claim 5, further comprising:
    selecting a value of the distance from a range of distance values, wherein assigning the set of reference points in the database based at least in part on the selecting.

7. The method of claim 4, wherein encoding the digital representation of the audio signal comprises:
    ignoring, based at least in part on the set of reset frames, one or more dependencies of a packet of the encoded set of packets with respect to one or more other packets of the encoded set of packets; and
    encoding a current input frame of the audio signal based at least in part on the ignoring.

8. The method of claim 4, further comprising:
    determining a set of continuous packets of the encoded set of packets, wherein inserting the set of reset frames between the one or more packets of the encoded set of packets comprises:
        inserting a first reset frame prior to a first packet of the set of continuous packets of the encoded set of packets; and
        inserting a second reset frame after a last packet of the set of continuous packets of the encoded set of packets.

9. The method of claim 2, further comprising:
    determining one or more of a coding mode or a pitch gain associated with the coding standard, wherein pre-encoding the database is based at least in part on one or more of the coding mode or the pitch gain associated with the coding standard.

10. The method of claim 1, further comprising:
    estimating a scan result associated with the digital representation of the audio signal and the database, wherein encoding the digital representation of the audio signal is based at least in part on the scan result.

11. The method of claim 10, further comprising:
    training the machine learning scheme to match one or more scanning approach decisions for one or more digital representations of one or more audio signals with respect to the database, wherein estimating the scan result is based at least in part on the training.

12. The method of claim 1, wherein encoding the digital representation of the audio signal comprises:
encoding the digital representation jointly according to the coding standard and an additional coding standard different from the coding standard.

13. The method of claim 1, further comprising:
receiving a digital representation of a second audio signal;
identifying, based at least in part on the receiving of the digital representation of the second audio signal, a set of weighting coefficients of the machine learning scheme, wherein the set of weighting coefficients are associated with an additional coding standard different from the coding standard;
encoding the digital representation of the second audio signal using the machine learning scheme based at least in part on one or more weighting coefficients of the set of weighting coefficients;
generating a second bitstream of the digital representation of the second audio signal that is compatible with the additional coding standard based at least in part on the encoding of the digital representation of the second audio signal; and
outputting a representation of the second bitstream.

14. An apparatus comprising:
a processor,
memory coupled with the processor; and
instructions stored in the memory and executable by the processor to cause the apparatus to:
receive a digital representation of an audio signal;
identify, based at least in part on receiving the digital representation of the audio signal, a database that is pre-encoded offline according to a coding standard and that comprises a quantity of digital representations of other audio signals, wherein the quantity of digital representations of other audio signals satisfies a set of thresholds, the set of thresholds comprising one or more of a power level threshold, a sampling frequency threshold, or a bit depth threshold;
encode offline the digital representation of the audio signal using a machine learning scheme and information from the database pre-encoded according to the coding standard to match one or more frames of the digital representation of the audio signal to one or more frames from the database, wherein the encoded digital representation of the audio signal comprises one or more pre-encoded frames from the database that correspond to the one or more frames that match the digital representation of the audio signal;
generate a bitstream of the digital representation that is compatible with the coding standard and irrespective of online encoding based at least in part on encoding the digital representation of the audio signal offline; and
output a representation of the bitstream.

15. The apparatus of claim 14, wherein the instructions are further executable by the processor to cause the apparatus to:
pre-encode the database according to the coding standard prior to receiving the digital representation of the audio signal; and
select the pre-encoded database based at least in part on a criterion, wherein identifying the database pre-encoded according to the coding standard is based at least in part on the selecting.

16. The apparatus of claim 15, wherein the instructions to pre-encode the database according to the coding standard are executable by the processor to cause the apparatus to:
encode a set of packets according to the coding standard, wherein one or more packets of the set of packets correspond to a database frame in the database; and
insert a set of reset frames between one or more packets of the encoded set of packets.

17. The apparatus of claim 16, wherein the instructions are further executable by the processor to cause the apparatus to:
determine a set of reference points associated with the database based at least in part on the set of packets; and
assign the set of reference points in the database based at least in part on a parameter comprising a distance between reset frames of the set of reset frames, wherein inserting the set of reset frames is based at least in part on the assigning.

18. The apparatus of claim 16, wherein the instructions to encode the digital representation of the audio signal are executable by the processor to cause the apparatus to:
ignore, based at least in part on the set of reset frames, one or more dependencies of a packet of the encoded set of packets with respect to one or more other packets of the encoded set of packets; and
encode a current input frame of the audio signal based at least in part on the ignoring.

19. The apparatus of claim 14, wherein the instructions are further executable by the processor to cause the apparatus to:
receive a digital representation of a second audio signal;
identify, based at least in part on the receiving of the digital representation of the second audio signal, a set of weighting coefficients of the machine learning scheme, wherein the set of weighting coefficients are associated with an additional coding standard different from the coding standard;
encode the digital representation of the second audio signal using the machine learning scheme based at least in part on one or more weighting coefficients of the set of weighting coefficients;
generate a second bitstream of the digital representation of the second audio signal that is compatible with the additional coding standard based at least in part on the encoding of the digital representation of the second audio signal; and
output a representation of the second bitstream.

20. An apparatus comprising:
means for receiving a digital representation of an audio signal;
means for identifying, based at least in part on receiving the digital representation of the audio signal, a database that is pre-encoded offline according to a coding standard and that comprises a quantity of digital representations of other audio signals, wherein the quantity of digital representations of other audio signals satisfies a set of thresholds, the set of thresholds comprising one or more of a power level threshold, a sampling frequency threshold, or a bit depth threshold;
means for encoding offline the digital representation of the audio signal using a machine learning scheme and information from the database pre-encoded according to the coding standard to match one or more frames of the digital representation of the audio signal to one or more frames from the database, wherein the encoded digital representation of the audio signal comprises one or more pre-encoded frames from the database that correspond to the one or more frames that match the digital representation of the audio signal;

means for generating a bitstream of the digital representation that is compatible with the coding standard and irrespective of online encoding based at least in part on encoding the digital representation of the audio signal offline; and means for outputting a representation of the bitstream.

* * * * *